(12) United States Patent
Joshi

(10) Patent No.: US 11,176,776 B1
(45) Date of Patent: Nov. 16, 2021

(54) GAME ASSEMBLY

(71) Applicant: Amit Joshi, Sunnyvale, CA (US)

(72) Inventor: Amit Joshi, Sunnyvale, CA (US)

(73) Assignee: Amit Joshi, Sunnyvale, CA (US)

( * ) Notice: Subject to any disclaimer, the term of this patent is extended or adjusted under 35 U.S.C. 154(b) by 0 days.

(21) Appl. No.: 16/599,001

(22) Filed: Oct. 10, 2019

Related U.S. Application Data

(60) Provisional application No. 62/743,548, filed on Oct. 10, 2018.

(51) Int. Cl.
| | |
|---|---|
| *G07F 17/32* | (2006.01) |
| *G06F 7/58* | (2006.01) |
| *A63F 3/00* | (2006.01) |
| *A63F 3/04* | (2006.01) |

(52) U.S. Cl.
CPC ........ *G07F 17/3244* (2013.01); *A63F 3/0052* (2013.01); *A63F 3/00643* (2013.01); *G06F 7/58* (2013.01); *G07F 17/3267* (2013.01); *A63F 2003/046* (2013.01)

(58) Field of Classification Search
None
See application file for complete search history.

(56) References Cited

U.S. PATENT DOCUMENTS

| | | | |
|---|---|---|---|
| 8,500,546 B2* | 8/2013 | Walker ............... | G07F 17/3244 463/23 |
| 2010/0056241 A1* | 3/2010 | Acres ................ | G07F 17/3255 463/13 |
| 2020/0101370 A1* | 4/2020 | Shivers .............. | A63F 13/23 |

* cited by examiner

*Primary Examiner* — Ronald Laneau
(74) *Attorney, Agent, or Firm* — Plager Schack LLP; Mark H. Plager; Michael J. O'Brien

(57) ABSTRACT

A game assembly is configured to adjust an amount of money on a game token. The game assembly has a gameboard that uses a continuous path segregated into individually labeled areas. A random number generator randomly selects an integer between one and six. A token is placed on a first individually labeled area. A first instruction card is placed on the gameboard. The first instruction card designates a first play money amount to the token. A second instruction card is placed on the gameboard. Engaging the random number generator produces an integer that directs the token to move to a second individually labeled area. The integer links to instructions on the second instruction card for adjusting the first play money amount on the token.

10 Claims, 5 Drawing Sheets

16c

```
CHERRY PICKING

YOU HAVE GONE CHERRY PICKING! PAY BASED ON NUMBER OF
CHERRIES PICKED. (1lb =  $6)
1. 1 lb.
2. 2 lb.
3. 3 lb.
4. 4 lb.
5. 5 lb.
6. 6 lb.
```

```
AMUSEMENT PARK

UNLIMITED DAY PASS AT YOUR FAVORITE AMUSEMENT PARK.
                        PAY $50
```

FIG. 3D

CAR WASH

IT'S SUMMER! YOU DECIDE TO EARN MONEY BY DOING FEW CARWASHES. ($4 EACH). COLLECT MONEY BASED ON DICE SELECTION.

1. WASH MOM AND DAD'S CAR.
2. WASH 5 CARS
3. WASH 8 CARS
4. WASH 9 CARS
5. WASH 12 CARS
6. ALL PLAYERS WASH 24 CARS ALTOGETHER AND SHARE THE MONEY

FIG. 3E

GAME TOWN
MATH
$50   $50

GAME ASSEMBLY

RELATED APPLICATION

This application claims priority to provisional patent application U.S. Ser. No. 62/743,548 filed on Oct. 10, 2018, the entire contents of which is herein incorporated by reference.

BACKGROUND

The embodiments herein relate generally to board games.

Most children begin to learn mathematics around the age of five. However, mathematical operations such as addition, subtraction, multiplication and division are abstract ideas for children that require great deal of practice to master.

On the contrary, Children learn words and language in a natural way by observing each other, parents, teachers or other adults. Most children do not need any special practice in mastering language. However, numbers and mathematical operations are abstract concepts which require practice to understand and familiarize.

Some children are naturally good at understanding mathematical abstract concepts whereas a lot of children appear to struggle to understand these concepts. In order to master the basic mathematical operations, children need continuous practice to get themselves familiar with the numbers, rules and operations.

Some other endeavors in this field include U.S. Patent Application Pre-Grant Publication 2016/0303468 filed by Foster, U.S. Pat. No. 7,182,342 issued to Verdell, and U.S. Pat. No. 5,782,471 issued to Bautista. However, none of those use a randomly generated number multiple times. In addition, none of those use all arithmetic operations such as addition, subtraction, multiplication and division within a single game.

Embodiments of the disclosed invention solve these problems.

SUMMARY

The game assembly has a gameboard that uses a continuous path segregated into individually labeled areas, also referred to as game spaces. Tokens, also referred to as game markers representing participating players, are placed at starting positions. (Alternatively referred as Start or first instruction card). The start instruction card designates beginning play money amount to the token holders. Engaging the random number generator produces an integer that directs the token to move to subsequent individually labeled area. The integer generated by the random number generator is used to move the tokens to subsequent areas. The same integer is used to link instruction on the associated instruction cards for adjusting the play money amount on the token.

In some embodiments, the first instruction card directs the token to receive two hundred fifty dollars from a town authority at a beginning of a game. The first instruction card can further direct the token to receive fifty dollars from a town authority after the beginning of the game.

The subsequent instruction cards (alternatively referred to as a second instruction card) can direct the token to pay one or more amount of money in sum to a town authority. The subsequent instruction cards can direct the token to pay a multiplication product of the integer and one or more amount of money to a town authority. The subsequent instruction cards can direct the token to receive one or more amount of money in sum from town authority. The subsequent instruction cards can direct the token to receive a multiplication product of the integer and one or more amount of money from town authority. The subsequent instruction cards can direct the token to receive amount of money in sum or as a multiple from town authority, and share the proceeds amongst other tokens.

BRIEF DESCRIPTION OF THE FIGURES

The detailed description of some embodiments of the invention is made below with reference to the accompanying figures, wherein like numerals represent corresponding parts of the figures.

FIG. 3C shows a top plan view of one embodiment of the present invention;

FIG. 3D shows a top plan view of one embodiment of the present invention;

FIG. 3E shows a top plan view of one embodiment of the present invention; and

FIG. 4 shows a top plan view of one embodiment of the present invention;

DETAILED DESCRIPTION OF CERTAIN EMBODIMENTS

Embodiments of the disclosed invention utilize a game assembly along with some arithmetic operations. In addition, an augend and an addend are added to find a sum. In subtraction, a subtrahend is subtracted from a minuend to find a difference. In multiplication, a multiplicand and a multiplier are multiplied to find a product. In division, a dividend is divided by a divisor to find a quotient.

Figure 1:
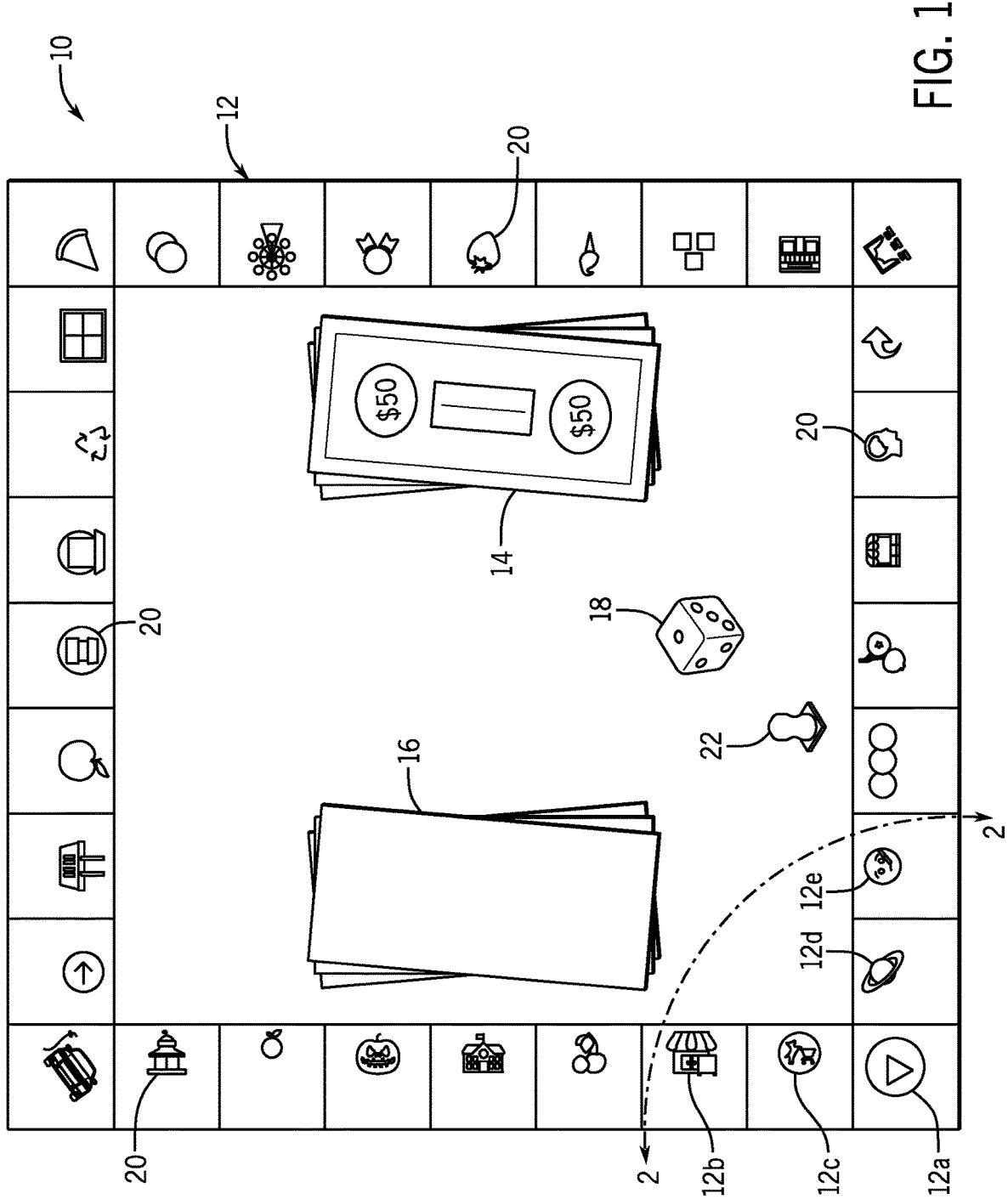
FIG. 1 shows a top plan view of one embodiment of the present invention.
Figure 2:
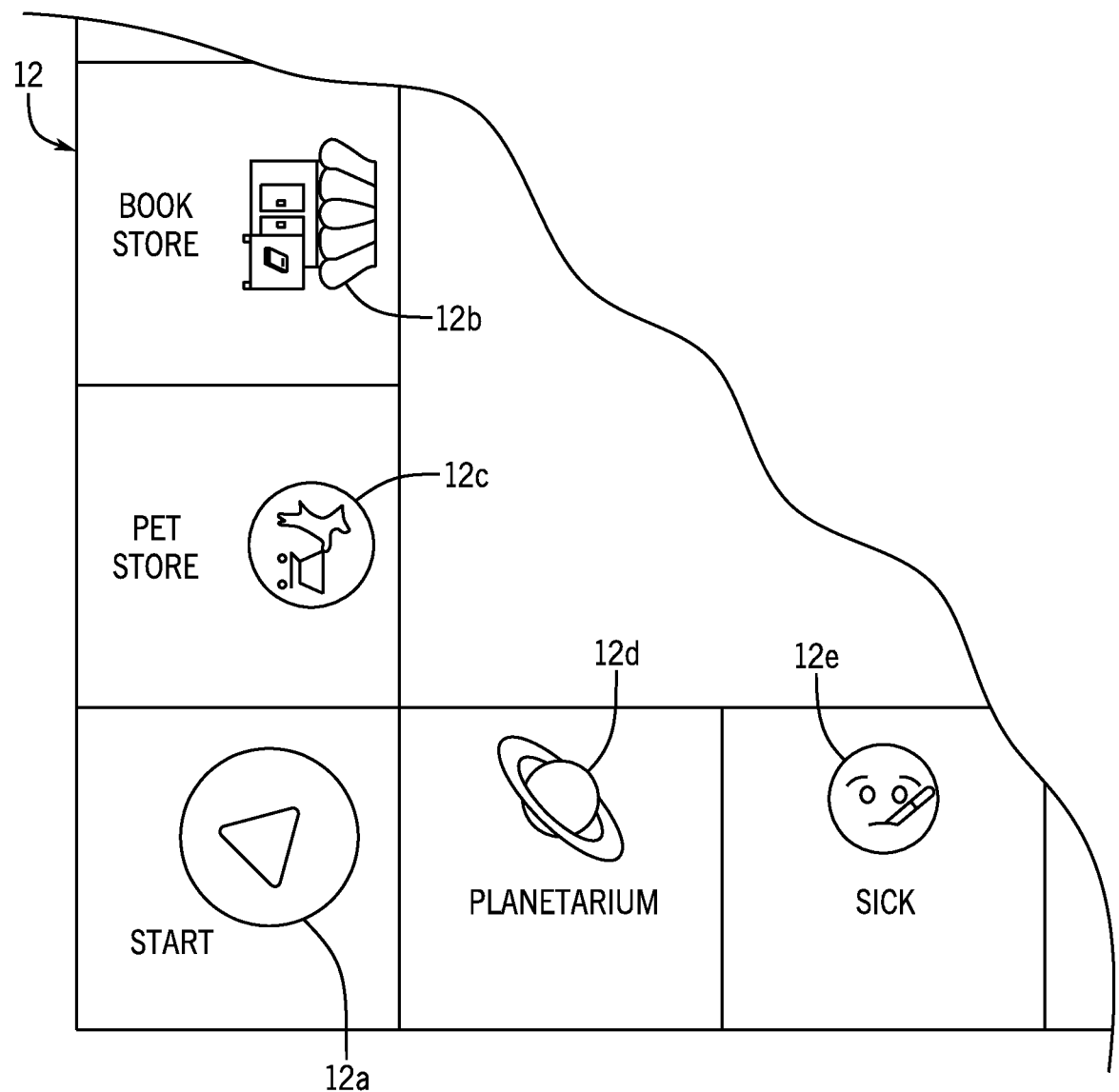
FIG. 2 shows a detail top plan view of one embodiment of the present invention indicated by line 2-2 in FIG. 1.

By way of example, and referring to FIG. 1, one embodiment of a game assembly 10 comprises a game board 12. As shown the game board has a continuous path of play with a series of individually labeled areas such as start icon 12a, bookstore icon 12b, pet store icon 12c, planetarium icon 12d, sickness icon 12e, and assorted other icons 20. Located near game board 12 is a stack 14 of play money 14a. Also located near game board 12 is a plurality of cards 16 including a start instruction card 16a, a pet store card 16b, a cherry picking card 16c, an amusement park card 16d, and a car wash card 16e.

A random number generator is needed to determine an integer such as an integer between one and six. The random number generator can be a die 18. The integer is determined once using the random number generator and then used to advance the token around the continuous path from a first individually labeled area to a second individually labeled area. The integer can be used to perform arithmetic operations in order to exchange money between at least one token 22 and the town authority. The integer could, for example, be at least one member of a variable set consisting of an augend, an addend, a subtrahend, a minuend, a multiplicand, a multiplier, a dividend, and a divisor.

Figure 3A:
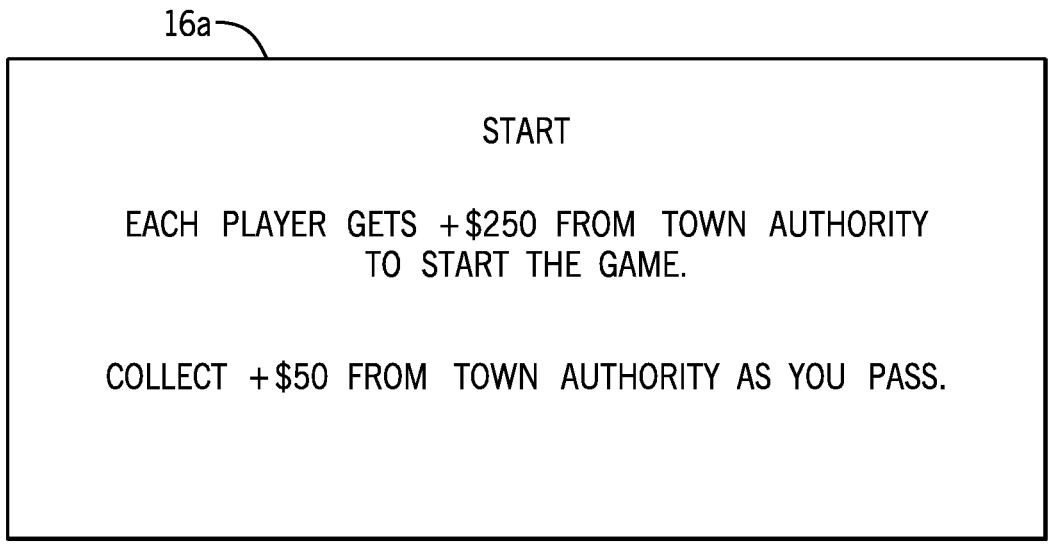
FIG. 3A shows a top plan view of one embodiment of the present invention.

Turning to FIG. 3A, the start instruction card 16a, each token gets 250 dollars from the town authority to start the game and then collects 50 dollars from the town authority as the token passes start icon 12a.

Figure 3B:
FIG. 3B shows a top plan view of one embodiment of the present invention.

Turning to FIG. 3B, when a token lands on a pet store icon, the token uses the integer to determine how much to pay to the town authority. For example, a '1' indicates $24 for an aquarium and $6 for gravel. A '2' indicates $15 for a goldfish. A '3' indicates $5 for dog treats, $6 for dog biscuits, $10 for chews, and $4 for a knot bone.

Turning to FIG. 3C, when a token lands on the cherry picking icon, the token pays a product of $6 and the integer. For example, a '1' indicates $6. A '2' indicates $12, and so on.

Turning to FIG. 3D, when a token lands on the amusement park icon the token pays $50 to the town authority regardless of the integer.

Turning to FIG. 3E, when a token lands on the car wash icon the token uses the integer to determine how much money is paid from the town authority to the token. For instance. A '1' indicates $4 is paid to the token. A '2' indicates that $20 is paid to the token. A '3' indicates $32 is paid to the token. A '4' indicates $36 is paid to the token. A '5' indicates that $48 is paid to the token. A '6' indicates that all tokens split $96.

Gameplay proceeds as follows. First, place the game board 12 on a place with a flat surface, such as on a table or on the floor. A supporter may be placed under the game board. This is particularly helpful when the surface is not flat.

The play time of the game can be time based or iteration based. If timed based, a total play time of 30 to 60 minutes is recommended for players under the age 12, and for the older players, the time period may be set at 60 minutes. Time can be measured for a timer operating in a loop where the timer starts and the game proceeds until the timer reaches a timer limit. The board game can be played with multiple players. For instance, 2 to 4 players make up for an enriching playing experience. The principle participants of the game are players that have designated markers or "tokens" to advance around continuous play path and an imaginary entity referred to as a town authority. The town authority is tasked with collecting money from players on behalf of game spaces of the board game. The town authority is also tasked with paying money to players on behalf of game spaces. In a 2-player game setting, each player would have his/or her game marker to advance around continuous play path. In a 3 to 4 player game setting, one player can be designated the town authority to facilitate transactions. In a 5-player game setting, 4 players can advance around the continuous play path using designated game markers whereas the 5th player can exclusively function as a town authority to handle transactions between players and game spaces from the board game. In addition, the players should decide the playing order beforehand.

When the game starts, each player places a token in the Start game space. Then the first player rolls the dice or otherwise engages a random number generator. When the first die settles on a resting surface, the number on the upper surface is the navigating number. The player moves his marker around continuous play path based on the dice number to land in a new game space. The player picks the associated game space card and conducts operation by reading instructions from the game card based on the rolled dice number. Each game card can have varying instructions to follow, and transactions to conduct based on the die number. These transactions are amongst the players and/or between the players and town authority.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A game assembly, configured to adjust an amount of money on a game token; the game assembly comprising:
    a gameboard further comprising a continuous path segregated into individually labeled areas;
    a random number generator; wherein the random number generator randomly selects an integer between one and six;
    a token, placed on a first individually labeled area;
    a first instruction card, placed on the gameboard; wherein the first instruction card designates a first play money amount to the token;
    a second instruction card, placed on the gameboard; wherein engaging the random number generator produces an integer that:
        directs the token to move to a second individually labeled area;
        links to instructions on the second instruction card for adjusting the first play money amount on the token.

2. The game assembly of claim 1, wherein the second instruction directs to the token to pay at least one amount of money in sum to a town authority.

3. The game assembly of claim 1, wherein the second instruction directs to the token to pay a product of the integer and at least one amounts of money to a town authority.

4. The game assembly of claim 1, wherein the first instruction card is a start game card.

5. The game assembly of claim 1, wherein the second instruction directs to the token to receive at least one or more amounts of money in sum from town authority.

6. The game assembly of claim 1, wherein the second instruction directs to the token to receive a product of the integer and at least one amounts of money from town authority.

7. The game assembly of claim 1, wherein the second instruction directs to the token to receive a product of the integer and at least one amounts of money from town authority, and share the proceeds with other participating tokens.

8. The collection of gaming pieces for playing a math game as set forth in claim 1, wherein the play money is in different denominations.

9. The collection of gaming pieces for playing a math game as set forth in claim 1, wherein the cards representing each game spaces have different instructions involving mathematical operations such as addition, subtraction, multiplication, division or a combination of those, which the player has to follow based on the number appearing on the rolled dice.

10. The collection of gaming pieces for playing a math game as set forth in claim 1, wherein there are specific cards that represent places typically observed in town and/or city settings, and simulate monetary transactions for easy learning and understanding life skills.

\* \* \* \* \*